United States Patent

Awarzamani et al.

[11] Patent Number: 5,915,626
[45] Date of Patent: Jun. 29, 1999

[54] FUEL INJECTOR

[75] Inventors: Assadollah Awarzamani, Markgroeningen; Stefan Maier, Schwieberdingen, both of Germany

[73] Assignee: Robert Bosch GmbH, Stuttgart, Germany

[21] Appl. No.: 08/898,817

[22] Filed: Jul. 23, 1997

[30] Foreign Application Priority Data

Jul. 23, 1996 [DE] Germany .................... 196 29 589

[51] Int. Cl.[6] .................................................. B05B 1/24
[52] U.S. Cl. .................. 239/135; 239/585.1; 239/585.4; 239/585.5; 137/341
[58] Field of Search ................... 239/135, 585.1, 239/585.4, 585.5; 251/129.21; 137/341

[56] References Cited

U.S. PATENT DOCUMENTS

| | | | |
|---|---|---|---|
| 3,868,939 | 3/1975 | Friese et al. | 239/135 |
| 5,040,497 | 8/1991 | Dingle | 123/179 |
| 5,054,458 | 10/1991 | Wechem et al. | 123/549 |
| 5,201,341 | 4/1993 | Saito et al. | 137/341 |

FOREIGN PATENT DOCUMENTS

| | | |
|---|---|---|
| 23 17 784 | 11/1973 | Germany . |
| 20 57 972 | 11/1974 | Germany . |
| 28 43 534 | 4/1979 | Germany . |
| 30 17 591 | 11/1981 | Germany . |
| 43 25 842 | 2/1995 | Germany . |
| 44 12 448 | 5/1995 | Germany . |
| 44 38 335 | 5/1996 | Germany . |

Primary Examiner—Joseph A. Kaufman
Assistant Examiner—Dinh Q Nguyen
Attorney, Agent, or Firm—Kenyon & Kenyon

[57] ABSTRACT

A fuel injector includes a magnetic coil whose power dissipation is utilized to pre-heat fuel flowing through the fuel injector. The magnetic coil is arranged so that a thermal coupling between the magnetic coil and the fuel flowing through a heat exchanger segment is acquired. In addition, a Peltier element (which functions as a heat pump) can be arranged between the magnetic coil and the heat exchanger segment. Furthermore, the fuel can also be heated using a heating coil.

14 Claims, 4 Drawing Sheets

FIG. 4
FIG. 5
FIG. 6
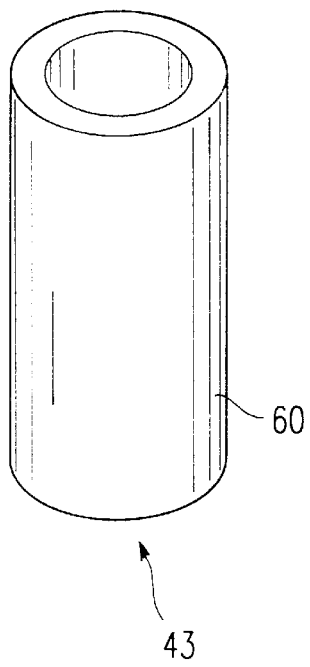
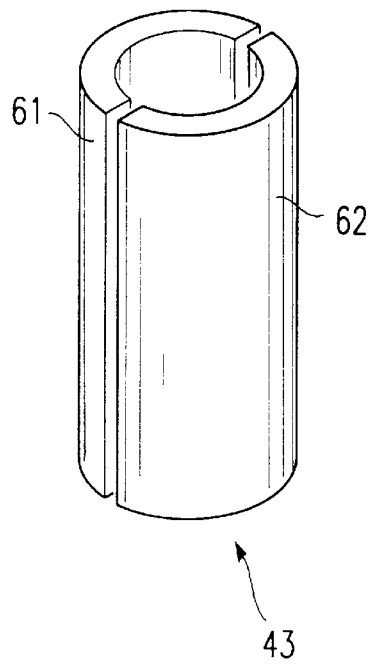
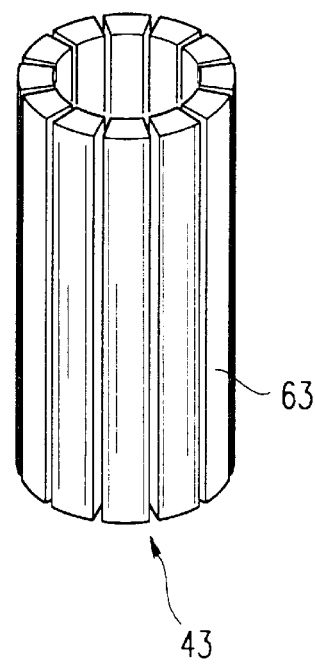

FUEL INJECTOR

FIELD OF THE INVENTION

The present invention relates to a fuel injector, and in particular to fuel injector systems of internal combustion engines.

BACKGROUND INFORMATION

German Patent Application No. 43 25 842 describes a conventional fuel injector, in which a valve closing element formed on a valve needle interacts with a valve seat surface to form a sealed seat. In order to lift the valve closing element of the valve needle from the valve seat surface, an armature is provided on the valve needle, which interacts with an electrically excitable magnetic coil to open the fuel injector. The fuel exits the fuel injector in the form of a fuel stream which partly hits the wall of the intake tube and the inlet valve of the internal combustion engine, where condensation of the injected fuel can occur in the cold state of the internal combustion engine or in case of a sudden change in load. Furthermore, the fuel injector can be exposed to a non-uniform operating temperature due to power dissipation of the magnetic coil.

German Patent Application No. 44 38 335 describes counteract wall wetting of the intake tube, where a wall of the intake tube is electrically heated using of a Peltier element to evaporate the fuel that impacts there. Using the Peltier element is advantageous (in comparison to using a conventional heating element, e.g., a PTC resistor element) since significantly lower heating output is required.

German Patent No. 20 57 972, and German Patent Application Nos. 28 43 534 and 30 17 591 describe methods to heat the fuel injected by the fuel injector. German Patent No. 20 57 972 describes a heating element provided in the fuel injector for heating the fuel, with the fuel flowing around the fuel injector. German Patent Application No. 28 43 534 describes connecting the injector with a fuel exit opening using an exit channel and arranging a heating element in the exit channel, which heats the fuel flowing through the exit channel. German Patent Application No. 30 17 591 describes an injector having a valve housing surrounded by a ring-shaped or tube-shaped heating cartridge, which is thermally connected with the valve housing. For heating the fuel, additional electrical heating power must be provided in the German Patent Applications described above.

SUMMARY OF THE INVENTION

The fuel injector according to the present invention is advantageous since a thermal power dissipation which is generated by a magnetic coil is utilized to pre-heat the fuel. It is further advantageous that additional electrical power does not have to be applied to pre-heat the fuel. At the same time, the magnetic coil is cooled (which counteracts overheating of the fuel injector and any damage resulting from the overheating). Furthermore, the fuel injector is subject to a uniform operating temperature, so that an improved function of the fuel injector is achieved. Pre-heating of the fuel counteracts wall wetting of the intake tube, thereby reducing harmful components in an exhaust.

By using a Peltier element (which functions as a heat pump) arranged between the magnetic coil and the fuel feed channel, a degree of effectiveness is further improved. The electrical power additionally required for operating the Peltier element is relatively low.

BRIEF DESCRIPTION OF THE DRAWINGS

FIG. 4 shows a Peltier element as a hollow cylinder utilized in the third embodiment as illustrated in FIG. 3.

FIG. 5 shows the Peltier element formed by two half-shells utilized in the third embodiment as illustrated in FIG. 3.

FIG. 6 shows the Peltier element formed by several axial strips utilized in the third embodiment as illustrated in FIG. 3.

DETAILED DESCRIPTION

Figure 1:
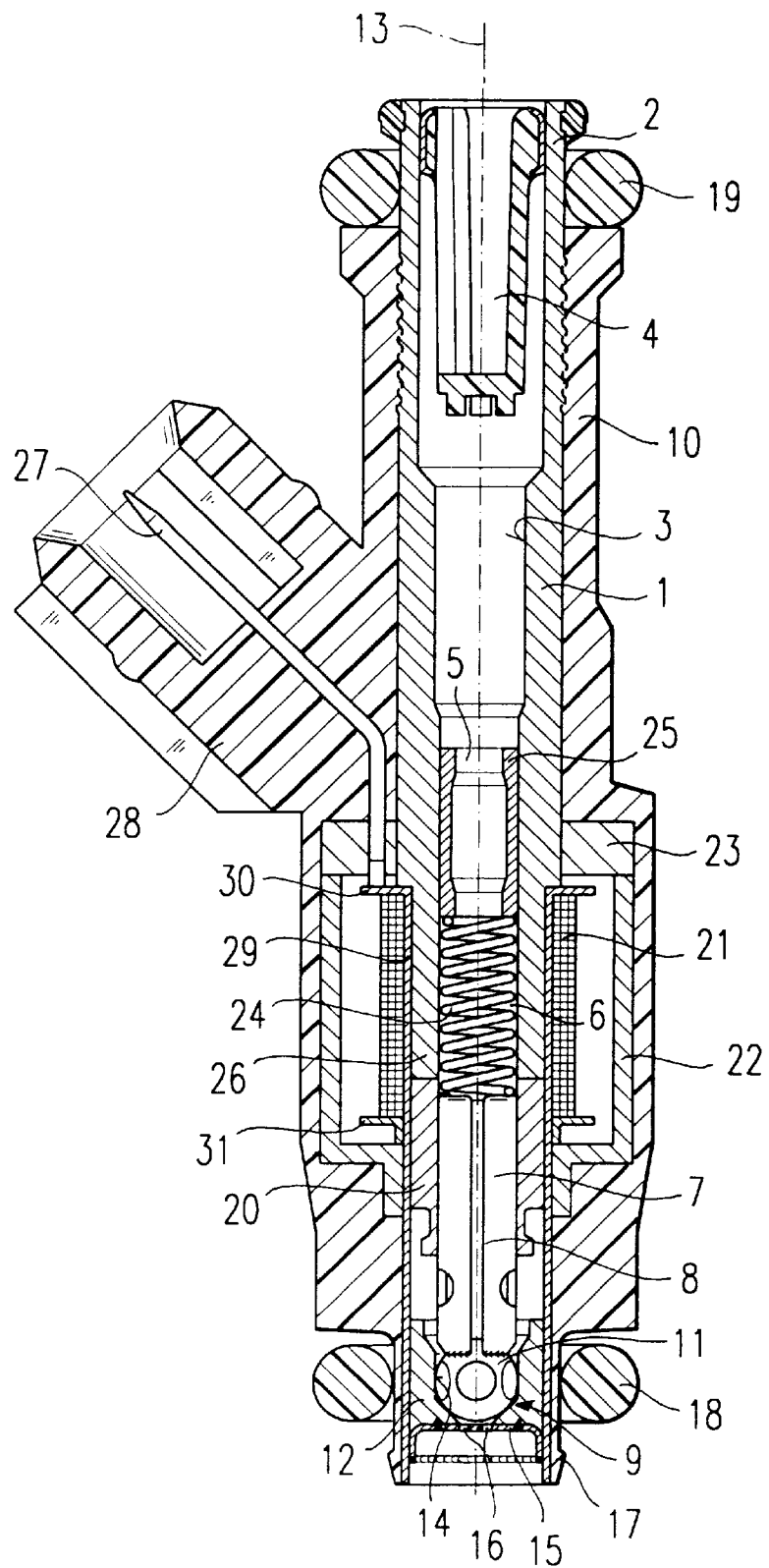
FIG. 1 shows a cross-section through a first embodiment of the fuel injector according to the present invention.

The electromagnetically activated valve shown in FIG. 1 (e.g., an injection valve for fuel injection systems of mixture-compressing, internal combustion engines with externally supplied ignition) has a core 1. Core 1 has inlet-side core end 2 serving as a fuel inlet nozzle. In stepped flow bore 3 provided in core 1, a fuel filter 4 is inserted in the region of inlet-side core end 2. Stepped flow bore 3 is part of a fuel feed channel which extends (e.g., via a valve needle bore 8 provided in a valve needle 7) to a sealed seat 9, and has a heat exchanger segment 6 (explained below). Core 1 is surrounded by a housing 10, which can be provided using, e.g., a plastic injection-molding process.

On its downstream side, valve needle 7 has a spherical valve closing element 11. Spherical closing element 11 interacts with the valve seat surface of a valve seat element 12, whose surface narrows frustoconically in the flow direction. A guide aperture 14 of valve seat element 12 serves to guide valve closing element 11 during an axial movement of valve needle 7 along a longitudinal valve axis 13. On a face facing away from valve closing element 11, valve seat element 12 is connected to a spray-orifice plate 15, which is structured in pot form in the first embodiment according to the present invention using, e.g., a circumferentially-sealed weld seam. Several injection apertures 16 are formed in spray-orifice plate 15 using an erosion or punching process. A downstream housing segment 17 surrounds a sleeve 29 serving a valve seat carrier to hold valve seat element 12. Housing segment 17 is surrounded by a bottom gasket ring 18, while fuel inlet nozzle at inlet side core end 2 is sealed using a top gasket ring 19.

To lift valve needle 7 (and, therefore, to open the fuel injector) valve needle 7 is rigidly connected to an armature 20, which interacts electromagnetically with a magnetic coil 21. Armature 20 is part of a magnetic flow circuit, which is closed by core 1, an axial ferromagnetic conductor element 22, and a radial ferromagnetic conductor element 23. In case of electrical excitation of magnetic coil 21, armature 20 is drawn in the direction of core 1, until it rests against core 1. Thus, valve needle 7 and valve closing element 11 connected thereto is lifted slightly from the valve seat surface and the fuel injector is opened. The axial movement of valve needle 7 takes place against a restoring spring 24, which rests against an adjustment sleeve 25 that is inserted into step-shaped flow bore 3. Adjustment sleeve 25 which can be formed from, e.g., rolled spring sheet steel adjusts a spring tension of restoring spring 24 and includes a flow passage 5 as part of the fuel feed channel.

The insertion depth of valve seat element 12 determines a setting of the stroke of valve needle 7. Thus, when magnetic coil 21 is not excited, an end position of valve needle 7 is determined by contact of valve closing element 11 against the valve seat surface of valve seat element 12, while, when magnetic coil 21 is excited, the other end position of valve needle 7 is determined from contact of armature 20 with a downstream core end 26.

In housing 10, a plug-in connection 28 is formed laterally, into which a contact plug (not shown) can be inserted for electrical contact with contact pins 27 which are connected with the winding of magnetic coil 21.

In the first embodiment according to the present invention shown in FIG. 1, it is important for a thermal contact having a good heat conductivity to exist between magnetic coil 21 and heat exchanger segment 6 of flow bore 3. The winding of magnetic coil 21 is therefore wound onto a relatively thin winding carrier, which is structured as a cylindrical sleeve 29 and composed of a material with good heat conductivity. The winding of magnetic coil 21 is delimited (in the axial direction) by a sleeve collar 30 of sleeve 29 on the one side, and by an angled ring 31, pushed onto sleeve 29, on the other side. Sleeve 29 extends in the flow direction until reaching valve seat element 12, and to a downstream end of the fuel injector. Sleeve 29 therefore forms a valve seat carrier.

Sleeve 29 transfers the thermal power dissipation given off by magnetic coil 21, in the radial direction, to downstream core end 26 which forms the wall of heat exchanger segment 6 and faces valve needle 7. In this region, downstream core end 26 has a relatively thin wall, so that good thermal coupling between magnetic coil 21 and the fuel flowing through heat exchanger segment 6 is obtained. Since the power dissipation of the magnetic coil typically lies in the range of 10 to 15 Watts, a significant pre-heating of the fuel is achieved, so that the fuel evaporates more rapidly after exiting from the fuel injector. This reduces wall wetting of the intake tube of the internal combustion engine and thereby achieves a reduction in harmful components in the exhaust. At the same time, the improved heat dissipation via the fuel flow counteracts overheating of the fuel injector and any damage caused by the overheating. As a result of the uniform operating temperature of the fuel injector according to the present invention, improved functioning and a longer lifetime of the fuel injector are ensured.

Figure 2:
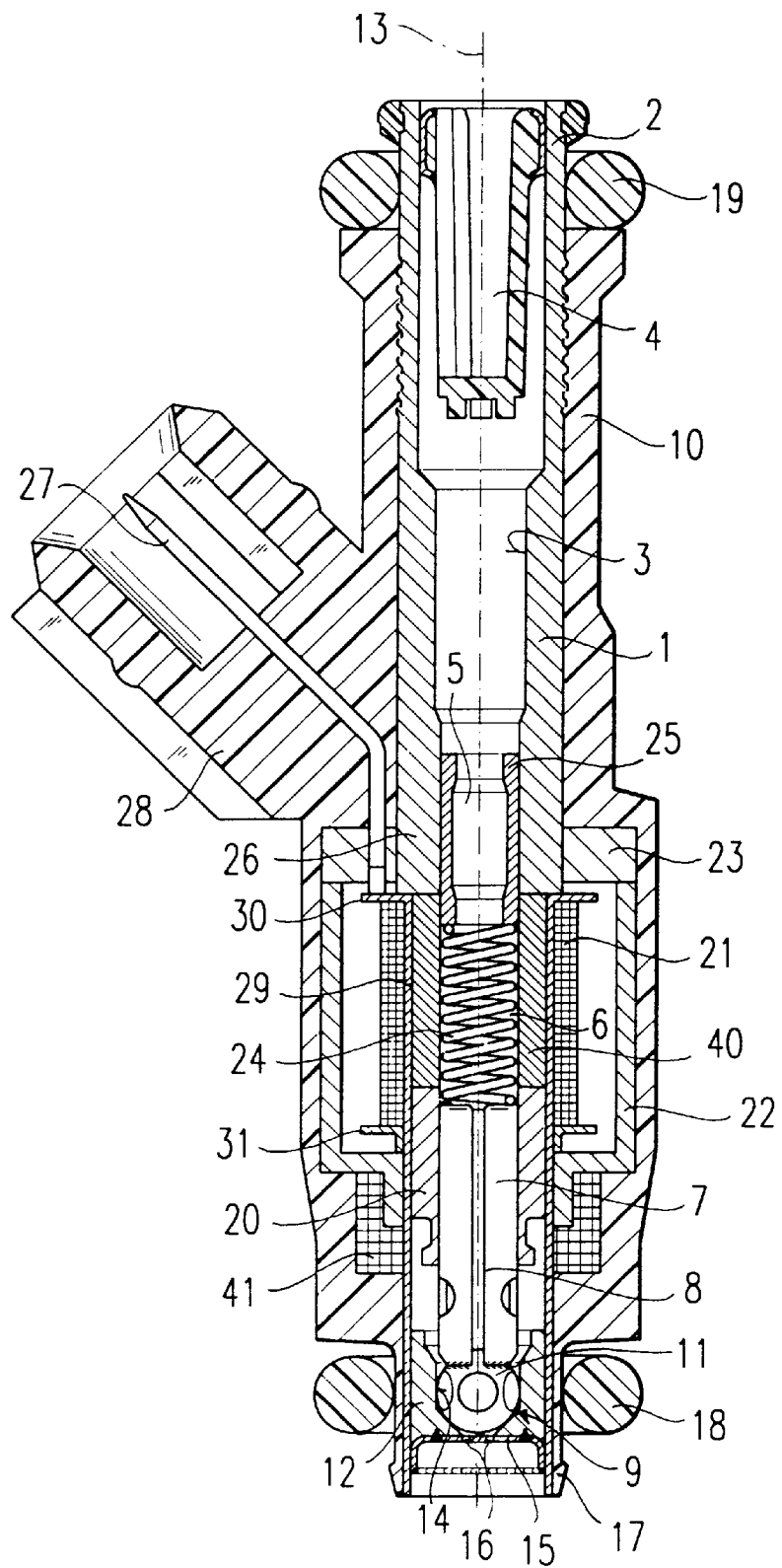
FIG. 2 shows a cross-section of a second embodiment of the fuel injector according to the present invention.

FIG. 2 shows a second exemplary embodiment of the fuel injector according to the present invention. The embodiment shown in FIG. 2 substantially corresponds to the embodiment described above with respect to FIG. 1. The embodiment shown in FIG. 2 has additional aspects according to the present invention. Downstream core end 26 of core 1 extends only to the inlet-side end of magnetic coil 21. A heat conductor element 40 composed of a material with particularly high heat conductivity and cylinder-shaped is arranged between downstream core end 26 and armature 20. Heat conductor element 40 serves to further improve the thermal coupling between magnetic coil 21 and the fuel which flows through heat exchanger segment 6. Heat conductor element 40 may have cooling ribs on its inside, facing heat exchanger segment 6.

The winding of magnetic coil 21 can also be wound directly onto heat conductor element 40 in FIG. 2 (e.g., downstream core end 26 shown in FIG. 1) without the winding carrier including sleeve 29 and ring 31.

In addition, the fuel injector shown in FIG. 2 has a heating coil 41 for additional heating of the fuel flowing through valve needle bore 8. Any known heat-producing resistor element can be used as a heating coil 41. The power supply to heating coil 41 can be provided via connecting lines (not shown) and contact pins 27 of magnetic coil 21. Furthermore, heating coil 41 can be switched in parallel with magnetic coil 21. However, the power supply can also be provided via separate contact pins in plug-in connection 28. In the second embodiment according to the present invention shown in FIG. 2, the heat produced by heating coil 41 is given off to valve needle 7 and therefore to the fuel flowing through valve needle bore 8 via axial conductor element 22, sleeve 29, and armature 20. Thus, the heating of the fuel flowing through the fuel injector can be provided as necessary, independent of the power dissipation of magnetic coil 21.

Figure 3:
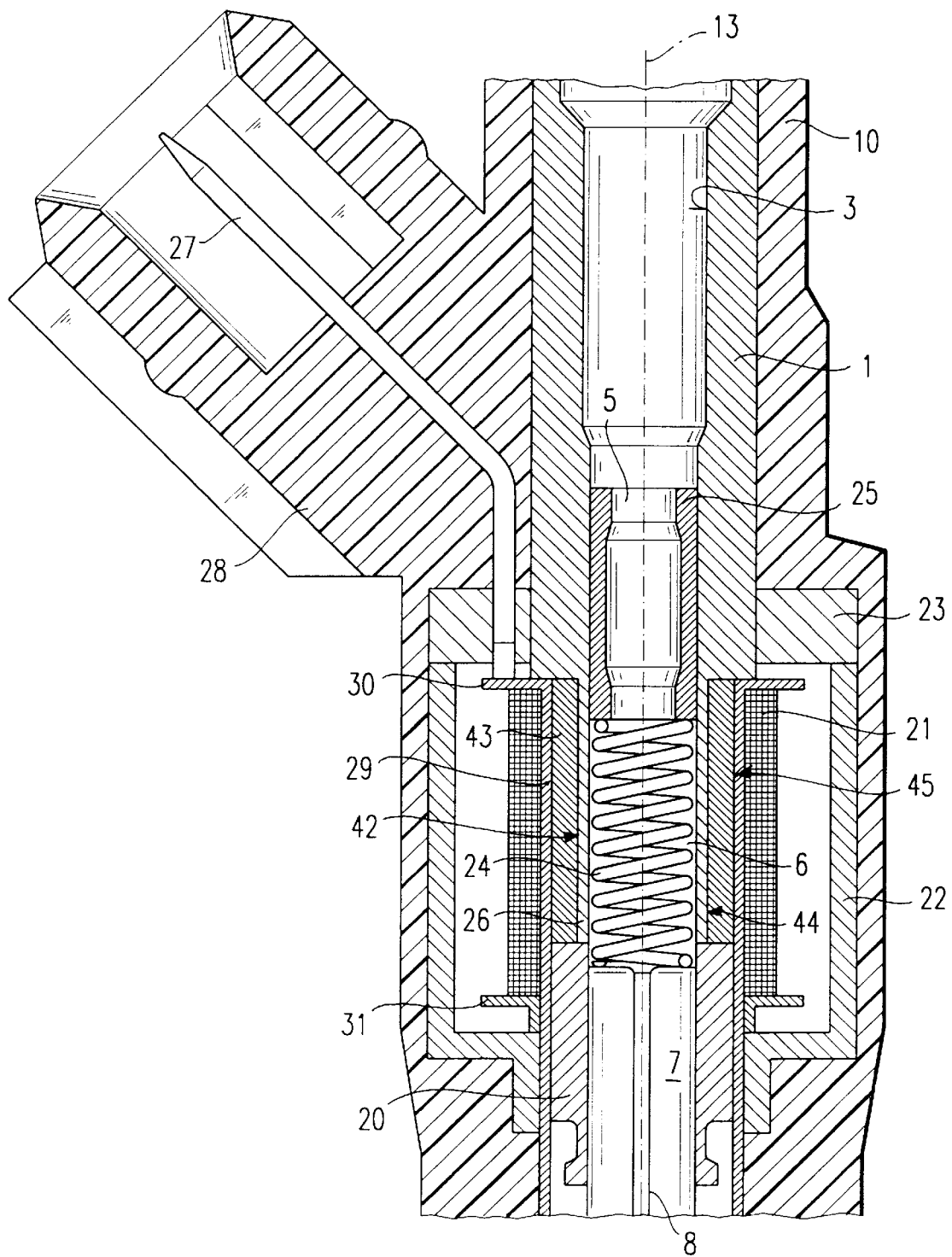
FIG. 3 shows an enlarged partial cross-section of a third embodiment of the fuel injector according to the present invention.

FIG. 3 shows an enlarged of a second embodiment according to the present invention. Bottom core end 26 has an axial groove 42 into which a Peltier element 43 is axially inserted functioning as a heat pump. A first surface 44 of Peltier element 43 (which heats up during operation) faces heat exchanger segment 6 of flow bore 3, while a second surface 45 of Peltier element 43 (which cools off during operation) faces magnetic coil 21.

Peltier element 43 utilizes the effect that a temperature difference is generated between the pn transitions of semiconductor materials with different doping (p type, n type), depending on the direction of a current which flows through the pn transitions. If several Peltier cells of p-conductive and n-conductive semiconductors are switched to be behind one another electrically, but parallel thermally, providing Peltier element with a relatively high degree of effectiveness. For example, several such strip-shaped Peltier cells can be brought together to form a Peltier element, and separated from one another by thin ceramic plates. Thus, the pn transitions which cool off during operation of Peltier element 43 are located in the region of surface 45 which faces the magnetic coil 21, while the pn transitions which heat up during operation of Peltier element 43 are located in the region of surface 44 which faces heat exchanger segment 6. The power supply of Peltier element 43 can be provided via connecting lines (not shown) directly via the contact pins which serve to supply power to magnetic coil 21, where Peltier element 43 can be electrically switched in parallel with magnetic coil 21. It is also possible to provide separate contact pins for the power supply of Peltier element 43, in plug-in connection 28.

Using an arrangement of a heat pump in the form of a Peltier element 43 between magnetic coil 21 and heat exchanger segment 6, the degree of effectiveness of the arrangement is significantly improved, and an efficient preheating of the fuel which flows through heat exchanger segment 6 is achieved, and at same time, the magnetic coil 21 is efficiently cooled.

FIGS. 4–6 show various forms of Peltier element 43. Peltier element 43 shown in FIG. 4 is designed as a hollow cylinder 60, which can be inserted into axial groove 42 of the third embodiment illustrated in FIG. 3. FIG. 5 shows a version of Peltier element 43 as two half-shells 61 and 62 are arranged to form a hollow cylinder. Peltier element 43 shown in FIG. 6 is divided into several strips 63 which extend axially, curved in the circumference direction, which are arranged to form a hollow cylinder. Half-shells 61, 62 and strips 63 can be separated and insulated from one another by means of ceramic layers. Half-shells 61, 62 and strips 63 can also be held by axial groove 42 as shown in FIG. 3.

The present invention is not limited to the embodiments described above. For example, Peltier element 43 functioning as a heat pump can also be arranged at a different location of the fuel injector, in order to take advantage of heat sources in the surroundings of the fuel injector to heat the fuel which flows through the fuel injector. In particular, the heat of the internal combustion engine can be utilized to pre-heat the fuel. Also, the winding carrier, particularly sleeve 29, could be structured as a Peltier element.

What is claimed is:

1. A fuel injector for a fuel injection system of an internal combustion engine, comprising:
    a valve seat element;
    a value needle including a valve closing element, the valve closing element cooperating with the valve seat element to form a sealed seat;
    a fuel inlet nozzle;
    a fuel feed channel extending from the fuel inlet nozzle to the sealed seat and including a heat exchanger segment;
    an armature connected to the valve needle; and
    a magnetic coil segmentally surrounding the fuel feed channel and cooperating with the armature to actuate the fuel injector, the magnetic coil being thermally coupled to the heat exchanger segment,
    wherein the magnetic coil is coupled to the heat exchanger segment one of directly and via a heat-conductive winding carrier holding the magnetic coil, and
    wherein the heat-conductive winding carrier extends from the magnetic coil to the valve seat element.

2. A fuel injector for a fuel injection system of an internal combustion engine, comprising:
    a valve seat element;
    a valve needle including a valve closing element, the valve closing element cooperating with the valve seat element to form a sealed seat;
    a fuel inlet nozzle;
    a fuel feed channel extending from the fuel inlet nozzle to the sealed seat and including a heat exchanger segment;
    an armature connected to the valve needle; and
    a magnetic coil segmentally surrounding the fuel feed channel and cooperating with the armature to actuate the fuel injector, the magnetic coil being thermally coupled to the heat exchanger segment,
    wherein the magnetic coil is coupled to the heat exchanger segment one of directly and via a heat-conductive winding carrier holding the magnetic coil,
    wherein the winding carrier includes a thin-wall sleeve composed of a high heat conductivity material, the thin-wall sleeve surrounding the heat exchanger segment, and
    wherein the magnetic coil is wound around the thin-wall sleeve.

3. The fuel injector according to claim 2, wherein the winding carrier includes a ring and a sleeve collar, the sleeve collar radially extending to the thin-wall sleeve and positioned at one end of the thin-wall sleeve, the sleeve collar and the ring limiting an extension of the magnetic coil along an axial direction of the fuel injector, the ring being settable on the thin-wall sleeve.

4. The fuel injector according to claim 1, wherein the heat exchanger segment includes a heat conductor element composed of a high heat conductivity material.

5. A fuel injector for a fuel injection system of an internal combustion engine, comprising:
    a valve seat element;
    a valve needle including a valve closing element, the valve closing element cooperating with the valve seat element to form a sealed seat;
    a fuel inlet nozzle:
    a fuel feed channel extending from the fuel inlet nozzle to the sealed seat and including a heat exchanger segment;
    an armature connected to the valve needle;
    a magnetic coil segmentally surrounding the fuel feed channel and cooperating with the armature to actuate the fuel injector, the magnetic coil being thermally coupled to the heat exchanger segment; and
    a Peltier element operating as a heat pump and being positioned between the magnetic coil and the heat exchanger segment, the Peltier element having a first surface facing the heat exchanger segment and a second surface facing the magnetic coil,
    wherein the magnetic coil is coupled to the heat exchanger segment one of directly and via a heat-conductive winding carrier holding the magnetic coil, and
    wherein, when the Peltier element is operating, a first temperature of the first surface increases and a second temperature of the second surface decreases.

6. The fuel injector according to claim 5, wherein the Peltier element includes a continuous hollow cylinder.

7. The fuel injector according to claim 5, wherein the Peltier element is divided into two half-shells forming a hollow cylinder.

8. The fuel injector according to claim 5, wherein the Peltier element is divided into a plurality of strips extending in an axial direction, the plurality of strips being circumferentially curved to form a hollow cylinder.

9. The fuel injector according to claim 2, wherein the thin-wall sleeve has a plurality of holes.

10. A fuel injector for a fuel injection system of an internal combustion engine, comprising:
    a valve seat element;
    a valve needle including a valve closing element, the valve closing element cooperating with the valve seat element to form a sealed seat;
    a fuel inlet nozzle;
    a fuel feed channel extending from the fuel inlet nozzle to the sealed seat and including a heat exchanger segment;
    an armature connected to the valve needle;
    a magnetic coil segmentally surrounding the fuel feed channel and cooperating with the armature to actuate the fuel injector, the magnetic coil being thermally coupled to the heat exchanger segment; and
    a heating coil positioned between the magnetic coil and the sealed seat and extending along a fuel flow direction,
    wherein the magnetic coil is coupled to the heat exchanger segment one of directly and via a heat-conductive winding carrier holding the magnetic coil.

11. The fuel injector according to claim 2, wherein the high heat conductivity material includes a metal material.

12. The fuel injector according to claim 10, further comprising:
    a plug-in connector providing power to the magnetic coil and to the heating coil.

13. The fuel injector according to claim 12, wherein the magnetic coil and the heating coil are simultaneously actuated and deactuated.

14. The fuel injector according to claim 10, wherein the heating coil heats fuel upstream from the sealed seat.

* * * * *